J. F. CALLAWAY.
CAR-ROOF.

No. 173,764. Patented Feb. 22, 1876.

UNITED STATES PATENT OFFICE.

JAMES F. CALLAWAY, OF LOUISVILLE, KENTUCKY.

IMPROVEMENT IN CAR-ROOFS.

Specification forming part of Letters Patent No. 173,764, dated February 22, 1876; application filed January 26, 1876.

*To all whom it may concern:*

Be it known that I, JAMES F. CALLAWAY, of Louisville, in the county of Jefferson and State of Kentucky, have invented certain new and useful Improvements in Railroad-Cars; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to railroad-cars; and it consists in a weather and smoke protector for the car-platforms, as will be hereinafter more fully set forth.

Figure 1:
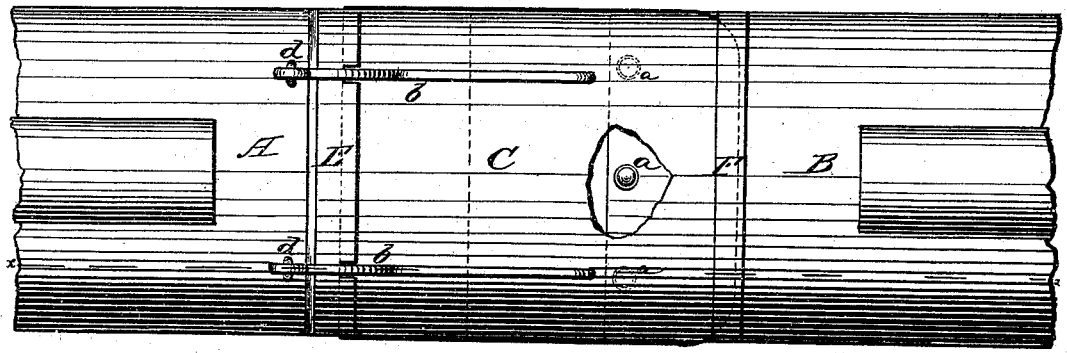
Figure 2:
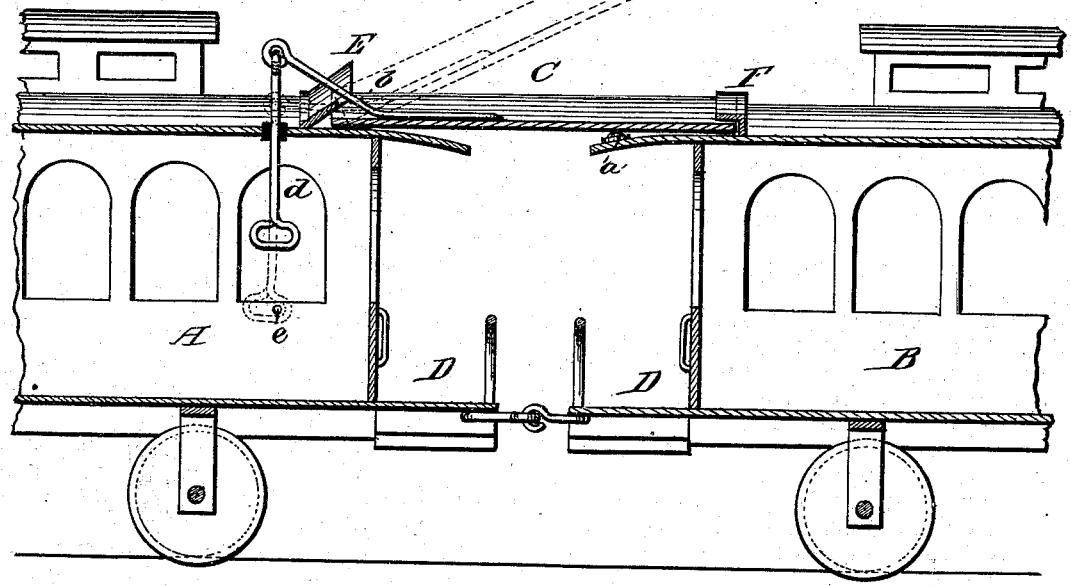

In the annexed drawing, Figure 1 is a top view, and Fig. 2 is a section on line $xx$, Fig. 1.

A and B represent the ends of two adjoining railroad-cars, each provided with the usual platform D, and coupled together by any of the known and usual means. On the roof of the car A, near the rear end, is hinged an apron, C, of sheet-iron, or other suitable material, which extends over the open space between the rear end of the car A and the front end of the car B, forming thereby a covering for protecting the car platforms and the coupling. Into the front end of the top of the car B are set small rollers or wheels $a$, upon which the outer end of the apron C rests, so as to prevent the wearing away or wearing off of said front end of the top of the car B by the motion or shaking while the cars are in motion. Back of the hinges which connect the apron C to the top of the car A is secured a strip, E, of tin, wood, or leather, extending entirely across the roof of the car, and forming a shield to prevent smoke, cinders, dust, or rain from passing in under the apron. On the roof of the car B is fastened a similar strip or shield, F, to cover the outer end of the apron C. The apron C is provided with two bent arms, $b\ b$, extending a suitable distance beyond the hinges, and to the outer ends of said arms are connected rods or chains $d\ d$, which pass down through holes in the roof to the inside of the car, by which means the apron may be raised as required for coupling the cars. Within the car A are hooks $e$, upon which the chains or rods $d$ may be attached for sustaining the apron in an elevated position when desired.

Having thus fully described my invention, what I claim as new, and desire to secure by Letters Patent, is—

1. An apron, C, hinged to the roof of one railroad-car, near one end, and overlapping the end of an adjoining railroad-car, for the purposes herein set forth.

2. The shields E and F attached to the roofs of the cars A and B, in combination with said cars, and the hinged apron C, substantially as and for the purposes herein set forth.

3. The combination of the hinged apron C, arms $b$, rods or chains $d$, and hooks $e$, as and for the purposes herein set forth.

In testimony that I claim the foregoing as my own I affix my signature in presence of two witnesses.

JAMES FLEMING CALLAWAY.

Witnesses:
GEO. STARKEY, Sr.,
CHARLES MATTHEWS.